Jan. 13, 1942.   C. E. BUTLER   2,269,971
BOWL HOLDING POT COVER FOR CENTRIFUGAL LIQUID SEPARATORS
Filed Nov. 16, 1940

Inventor
Clifford E. Butler,
By G. C. Kennedy
Attorney

Patented Jan. 13, 1942

2,269,971

UNITED STATES PATENT OFFICE 2,269,971

BOWL HOLDING POT COVER FOR CENTRIFUGAL LIQUID SEPARATORS

Clifford E. Butler, Waterloo, Iowa

Application November 16, 1940, Serial No. 365,900

1 Claim. (Cl. 233—1)

My invention pertains to improvements in closures, and particularly to bowl pot closures for centrifugal liquid separators, and the principal object of my improvements is to supply a device to be interposed between the bowl and bowl pot, to particularly close the latter when the separator is not functioning, removably.

The purpose of this invention therefore is to close the bowl pot when the separator is not functioning, to thereby prevent the entry of dust, insects or other intrusive elements thereinto, and permitting the removal of the closure before the separator is to be used.

I have achieved the above object by the means which is illustrated in the accompanying drawing, it being understood that various minor improvements and changes may be effected in the closure without departing from the scope of the invention or the protection of the appended claim.

Figure 1:
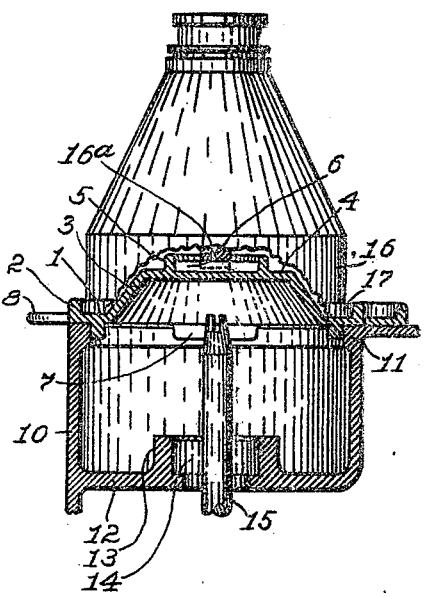
Figure 2:
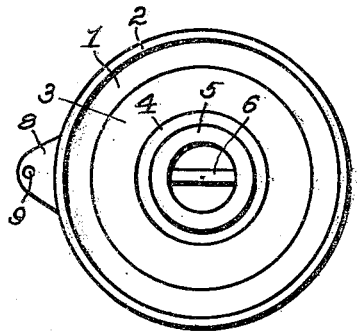

Fig. 1 depicts the assemblage of my improved type of closure as above stated, including the closure shown fitted between the bowl pot below and the separator bowl above, and with the bowl pot and its closure displayed in medial vertical section, while the lower end part of the separator bowl is shown broken away. Fig. 2 is a top plan of the closure, and Fig. 3 a bottom plan thereof.

Referring to said Fig. 1, the numeral 10 denotes the bowl pot of a centrifugal liquid separator, in which the bottom part is centrally apertured at 14 and with a surrounding spaced cylindric wall 13. The numeral 15 denotes the upper end of the separable bowl shaft as extending axially upwardly through the bowl pot 10.

My bowl pot closure 1 is an integral single body, discoidal, with an outwardly projecting finger lug 8, perforated at 9 so that when not in use it may be suspended from a nail or other hanger. The closure has an upwardly projecting marginal ring or wall part 2. The numeral 3 denotes an upwardly directed central truncated cone 3, and has an upwardly directed concentric low wall part 5 whose interspace is crossed diametrically by a wall part 6. The wall part or ledge 2 is spaced from the base of the conical frustum 3, thus affording therebetween a circular depression suitable to receive moisture or other droppings from the bowl 16 or other agencies. The conical part 3, upraised, may support the inwardly coned bottom part of the separator bowl 16, separably. The outwardly directed basal ring part of the bowl part 16 may removably fit within the cavity of the closure concentric wall 2.

Figure 3:
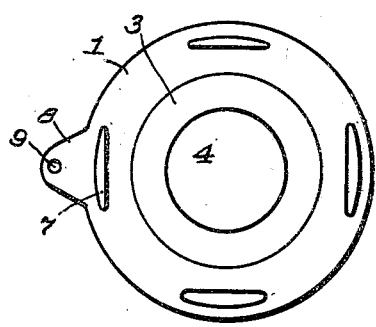

As shown in Figs. 1 and 3, a plurality of equally spaced lugs 7 depend from the bottom part of the closure circularly, and as also shown in Fig. 1, fit the inwardly directed part 11 of the bowl pot 10, removably.

The upwardly directed diametral rib 6 seats in a slot across the lower end of a member 16a depending from the bowl 16.

The finger lug 8 may also be used as a stop when it strikes against another part of the separator structure to keep the bowl holder from turning around while the bowl is being unscrewed and taken apart. The connection at 16a locks the bowl 16 to the cross-bar 6, preventing relative rotation of the bowl thereon.

I claim:

A device of the character described, consisting of a circular member having an upright marginal rim, a central upwardly directed hollow frusto-conical part spaced from said upright rim, a coaxial upwardly directed hollow wall of less diameter than the upper end part of the frusto-conical part and diametrically crossed by an upwardly disposed wall, a plurality of circularly spaced depending lugs coaxially disposed on the base of the circular member spaced from said upright marginal rim thereof, and a vertically apertured radial horizontal lug projecting laterally from said marginal rim.

CLIFFORD E. BUTLER.